United States Patent [19]

Ikeda et al.

[11] Patent Number: 5,913,074
[45] Date of Patent: Jun. 15, 1999

[54] BUFFER FLOW CONTROL UNIT FOR DYNAMICALLY COUNTING A NUMBER OF VIRTUAL CHANNELS PER SERVICE CLASS IN ASYNCHRONOUS TRANSFER NETWORK

[75] Inventors: Chinatsu Ikeda; Ruixue Fan, both of Tokyo, Japan

[73] Assignee: NEC Corporation, Japan

[21] Appl. No.: 08/746,927

[22] Filed: Nov. 18, 1996

[30] Foreign Application Priority Data

Nov. 20, 1995 [JP] Japan ................................. 7-300997

[51] Int. Cl.⁶ ........................... G06F 13/00; G01R 31/08
[52] U.S. Cl. ................................. 395/849; 370/235
[58] Field of Search .......................... 395/200.3–200.83, 395/849, 851, 853, 854, 871, 872, 880; 370/229, 235, 395, 396, 398, 412, 413, 414, 417, 418

[56] References Cited

U.S. PATENT DOCUMENTS

| | | | |
|---|---|---|---|
| 5,455,825 | 10/1995 | Lauer et al. | 370/413 |
| 5,511,177 | 4/1996 | Kagimasa et al. | 711/114 |
| 5,515,359 | 5/1996 | Zheng | 370/231 |
| 5,539,747 | 7/1996 | Ito et al. | 370/235 |
| 5,555,265 | 9/1996 | Kakuma et al. | 370/395 |
| 5,633,859 | 5/1997 | Jain et al. | 370/234 |
| 5,737,315 | 4/1998 | Moritomo | 370/235 |

OTHER PUBLICATIONS

J.W. Roberts, "Rate Envelope Multiplexing and Rate Sharing in B–ISDN", IEICE Trans. Commun., vol. E78–B, No. 4, Apr. 1995, pp. 431–438.

R. Fan, et al., "Expandable ATOM Switch Architecture (XATOM) for ATM LANS", Reprinted from 1994 IEEE International Conference on Communications, May 1–5, 1994, pp. 402–409.

*Primary Examiner*—Thomas C. Lee
*Assistant Examiner*—Harold J. Kim
*Attorney, Agent, or Firm*—Ostrolenk, Faber, Gerb &Soffen, LLP

[57] ABSTRACT

In the server control section, the number of virtual channel wherein data is being transmitted is counted per service class. The data output rate from each service class corresponds to the number of counted virtual channels in each service class.

20 Claims, 6 Drawing Sheets

BUFFER FLOW CONTROL UNIT FOR DYNAMICALLY COUNTING A NUMBER OF VIRTUAL CHANNELS PER SERVICE CLASS IN ASYNCHRONOUS TRANSFER NETWORK

BACKGROUND OF THE INVENTION

The present invention relates to an art of buffer control for fairly providing virtual channels in different service classes by a switch on Asynchronous Transfer Mode (ATM) network wherein a plural of service classes are available.

One of conventional data output methods from a plural of buffers by a buffer control unit is a polling method. In this method, data is sequentially taken one by one from each buffer. Another conventional method is Weighted Fair Queuing (James W. Roberts, "Rate Envelope Multiplexing and Rates Sharing in B-ISDN" disclosed in Trans. Commun. Vol. E78-B, No.4 April 1995). In this method, a weighted of service is determined according to how long a packet waits in a queue.

In the conventional output method from a plural of buffers by a buffer control unit, output from a buffer is determined regardless of the number of virtual channels in service classes that are input to each buffer. In the polling method, in case of a switch comprising a buffer in each service class is used, when the number of virtual channel in a service class increased, output from the buffer was less frequent in each virtual channel than in virtual channel in another service class.

In addition, in the Weighted Fair Queuing method, because a weighted of service is determined according to how long a packet waits in a queue, service is more fairly offered than the polling method. However when one virtual channel sent a large burst very quickly, the virtual channel was priorly offered. As a result, virtual channels were not always fairly offered.

SUMMARY OF THE INVENTION

It is an object of the present invention to provide aforementioned problems.

It is another object of the present invention to provide an art of a buffer control for fairly providing in different service classes.

The above objects of the present invention is achieved by a buffer control unit of a node on asynchronous transfer network wherein data belonging to a plural of service classes is transferred, the buffer control unit comprising: identification means for identifying a service class of reception data; a buffer provided in each service class to which the reception data identified by the identification means is input; and control means for counting per service class number of virtual channels wherein data is being transmitted.

That is, count per service class number of virtual channels wherein data is being transmitted and controlling data output among the buffers based on a rate corresponding to the counted number of virtual channels in each service class.

Moreover, output rates among buffers can be controlled based on the number of virtual channels wherein data exists in a buffer instead of the number of virtual channels wherein data is being transmitted in each service class.

When a virtual channel wherein minimum guaranteed bandwidth is specified exits, priorly outputting data of the virtual channel wherein the minimum guaranteed bandwidth is specified from the buffer.

As explained above, in the present invention, by changing a service rate according to the number of counted virtual channels, different service classes can be fairly provided.

BRIEF DESCRIPTION OF THE DRAWINGS

This and other objects, features and advantages of the present invention will become more apparent upon a reading of the following detailed description and drawings, in which.

DESCRIPTION OF THE PREFERRED EMBODIMENT

Figure 1:
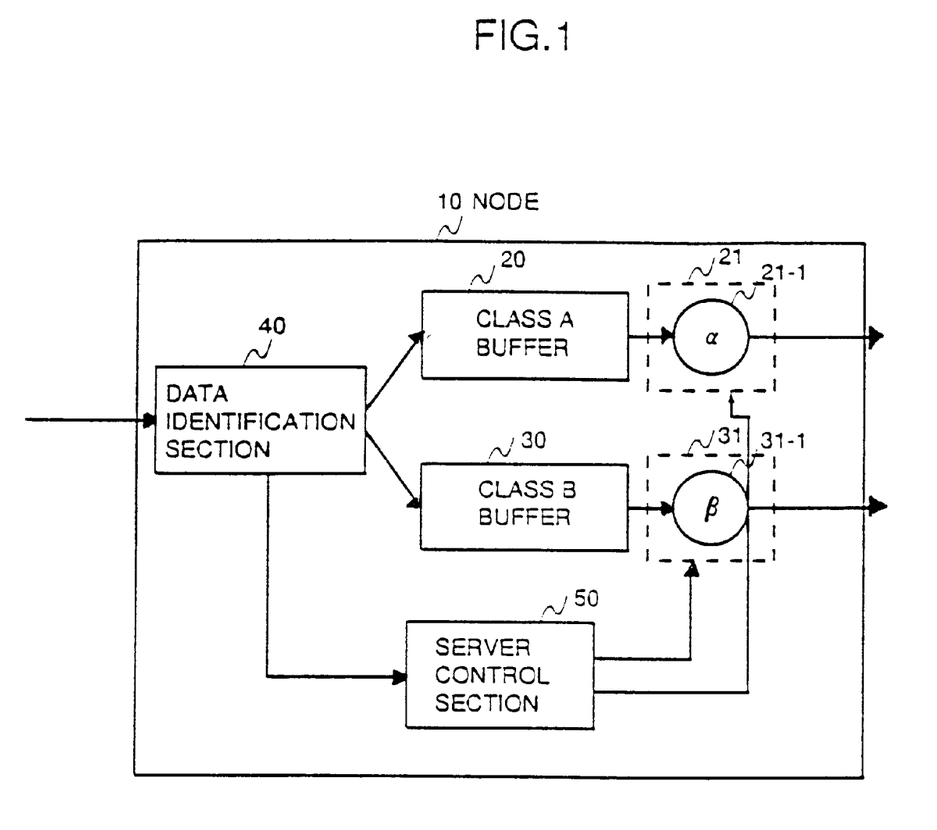
FIG. 1 is a block diagram of a first embodiment of the present invention.

FIG. 1 is a block diagram showing the first embodiment of the present invention. As illustrated in FIG. 1, the node 10 comprises the data identification section 40 for identifying the class of an input cell as class A or class B, the buffer 20 for class A, the buffer for class B, the server sections 21 and 31 for outputting a cell from each buffer, and the server control section 50 for counting the number of virtual channels wherein data of each service is being transmitted (referred to as VC, hereinafter) and controlling cell output from the server sections 21 and 31 based on the count number by the counters 21-1 and 31-1.

Figure 2:
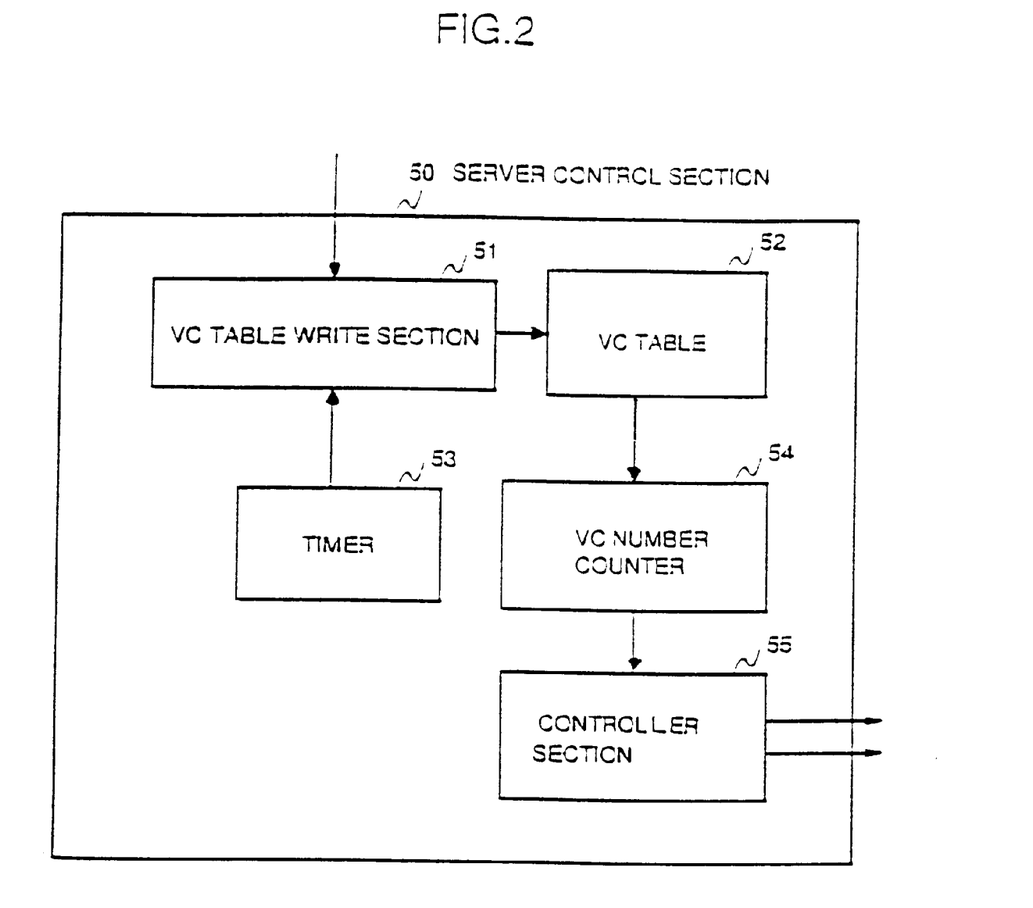
FIG. 2 is a block diagram of a server control section in the first embodiment.

FIG. 2 is a block diagram showing the composition of the server control section 50. The server control section 50 comprises the VC table write section 51 for updating the count of the cell number of the VC table when data is input to the node 10, the timer 53 provided in each VC for checking whether transmission is over, the VC table 52 for recording whether data is being transmitted in each VC, the VC number counter 54 for counting the number of VC's based on the VC table 52, and the controller section 55 for controlling cell output from the servers 21 and 31 based on the value displayed on the VC number counter.

Figure 3:
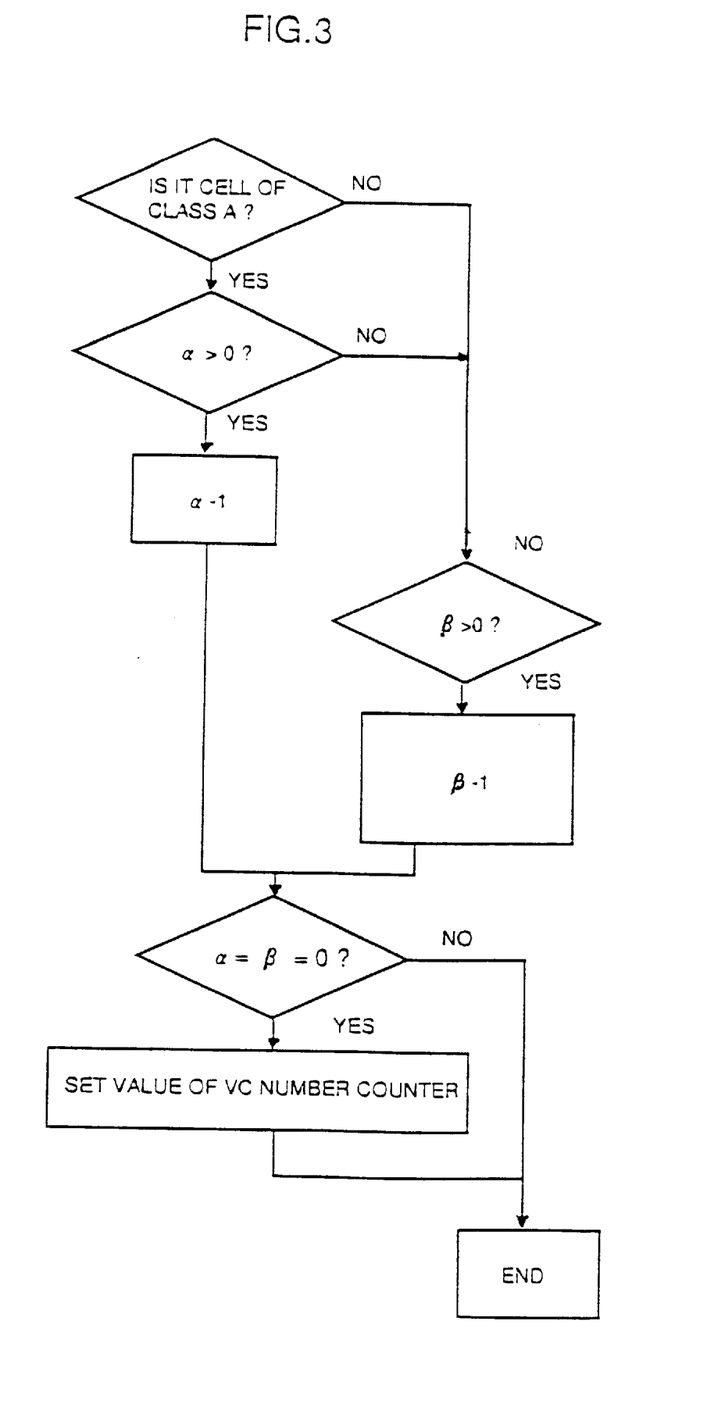
FIG. 3 is a flow chart of a second embodiment of the first embodiment.

FIG. 3 is a flow chart showing cell output control by the server control section 50.

Next, the operation of this embodiment is explained, referring to FIGS. 1, 2 and 3. The Greek letters $\alpha$ and $\beta$ of the counters 21-1 and 31-1 are counter values indicating the number of cells that can be output. When a cell reaches the node 10, the data identification section 40 identifies the class of the above-mentioned cell as class A or class B based on header information of the cell.

The cell's arrival as well as the VC number and the result of the class identification is then notified to the server control section 50 and added to the end of the buffer in the identified class. In the server control section 50, when the received VC in the VC table 52 is in an idle state, the state is changed to active and the VC number counter 54 increases the VC number in the VC service class by one. The timer corresponding to the VC is reset.

The cell output is controlled by the server control section 50. When a cell exists in the class A buffer 20 and the value of the Greek letter $\alpha$ is not zero, the server control section 50 takes one cell from the class A buffer and transmits the cell. The value of the Greek letter α is then decreased by one and the processing in the cell output time is completed. When the value of the Greek letter α is zero, the value of the Greek letter β is checked. When the value of the Greek letter β is larger than zero, a cell is output. The values of the Greek letters α and β become zero when the cell is output, the value of the VC number counter 54 is set to the counters 21-1 and 31-1 to complete the processing.

When a cell exists only in the class A buffer 20 and does not exist in the class B buffer 30 but the Greek letter α is zero and the Greek letter β is larger than zero, the cell is output from the class A buffer 20 and the values of the Greek letters α and β are not changed. The same procedure is applied to the reverse condition.

Then the value of the timer expires, the state of the VC table is changed from active to idle. The VC number counter 54 decreases the VC number in the VC service class by one.

In the first embodiment, the initial values of the counters 21-1 and 31-1 are set to the VC number counter 54. When the priorities of the service classes A and B are different, the initial values α and β of the counters 21-1 and 31-1 is multiplied by a fixed coefficient in the controller section 55 in order to weight the service rate. That is, the initial value of the service rates of each service class is calculated as follows: α×υ, β×(1−υ).

In the first embodiment, the VC number that is being transmitted is used as the VC coefficient for determining the rate of cell output. In the second embodiment, the VC number wherein a cell exists in the buffer is used.

Figure 4:
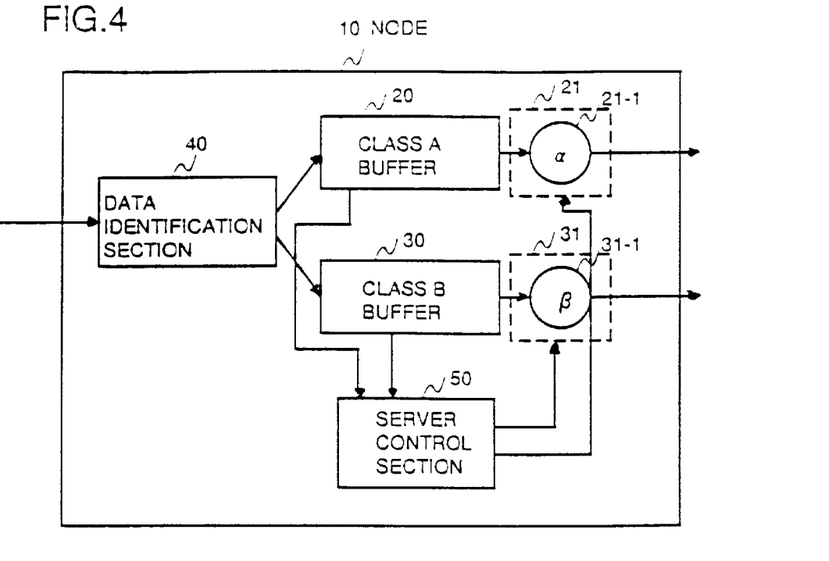
FIG. 4 is a flow chart of a second embodiment of the present invention.

FIG. 4 is a block diagram showing the second embodiment of the present invention. As illustrated in FIG. 4, the node 10 comprises the data identification section 40 for identifying the class of an input cell as class A or class B, the buffer 20 for class A, the buffer for class B, the server sections 21 and 31 for outputting a cell from each buffer, the counters 21-1 and 31-1 in the servers, and the server control section 50 for counting the VC number in each buffer and controlling cell output from the server sections 21 and 31 based on to the count value.

Figure 5:
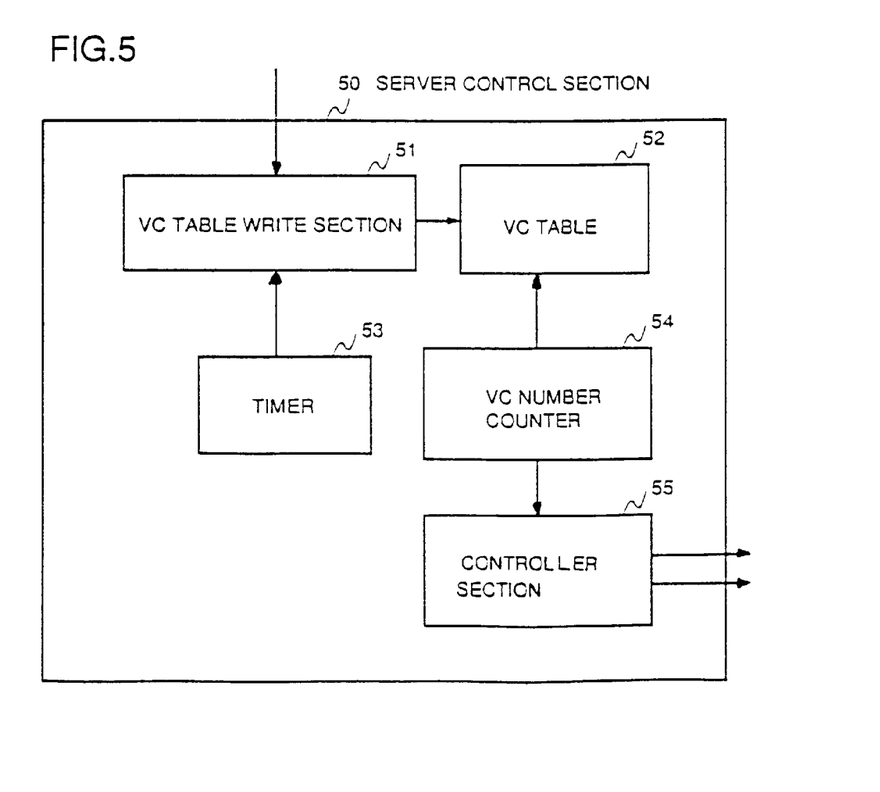
FIG. 5 is a block diagram of a server control section in the second embodiment of the present invention.

FIG. 5 is a block diagram showing the composition of the server control section 50. As illustrated in FIG. 5, the server control section 50 comprises the VC table write section 51 for updating the count of the cell number of the VC table at every input/output to/from the buffer, the VC table 52 for managing the service class, the VC number and the cell number of each VC, the VC number counter 54 for counting the VC number wherein a cell exists in the buffer for each service class, and the controller section 55 for controlling cell output from the server 21 and 31 based on the value displayed on the VC number counter by the counters 21-1 and 31-1.

When a cell in class A is input to the buffer 20, the server control section 50 increases the cell number with the corresponding VC number in the VC table by one. When the VC number is increased from zero to one, the VC number counter 54 increases the value of the VC number counter in the corresponding class by one and when the VC number is decreased from one to zero, the VC number counter 54 decreases the value of the VC number counter in the corresponding class by one.

A cell is output in the same way as described in the first embodiment.

In addition, in the above-mentioned embodiment, when the count value is changed from zero to one or one to zero, the value of the VC number counter is updated. Another method wherein the VC number count section 50 comprises a timer and whenever the timer expires, refers to the VC table 52 and counts the VC number with the cell number larger than one per class is also available.

Figure 6:
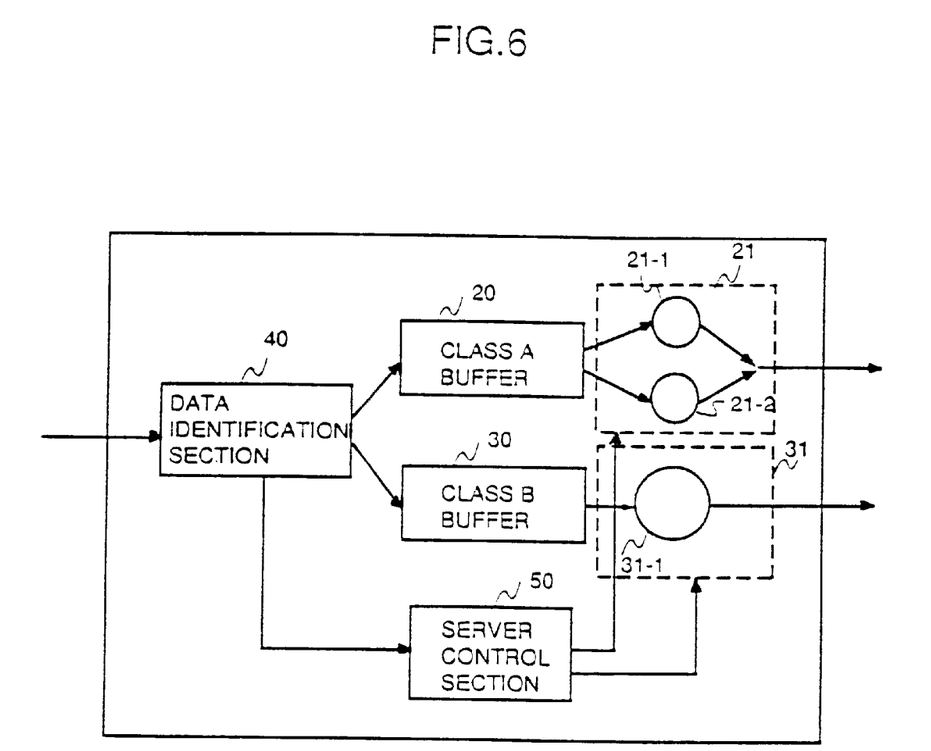
FIG. 6 is a block diagram of a third embodiment of the present invention.

FIG. 6 is a block diagram showing the third embodiment of the present invention. As illustrated in FIG. 6, the node 10 comprises the data identification section 40 for identifying the class of an input cell as class A or class B, the buffer 20 for class A, the buffer for class B, the server sections 21 and 31 for outputting a cell from each buffer, and the server control section 50 for controlling cell output form the server sections 21 and 31. Moreover, in this embodiment, virtual channel wherein only the class A has the minimum guaranteed bandwidth is illustrated, and the class A server section 21 comprises the server section 21-1 for outputting a cell at the minimum guaranteed bandwidth and the server section 21-2 for outputting a cell according to the counter value.

Figure 7:
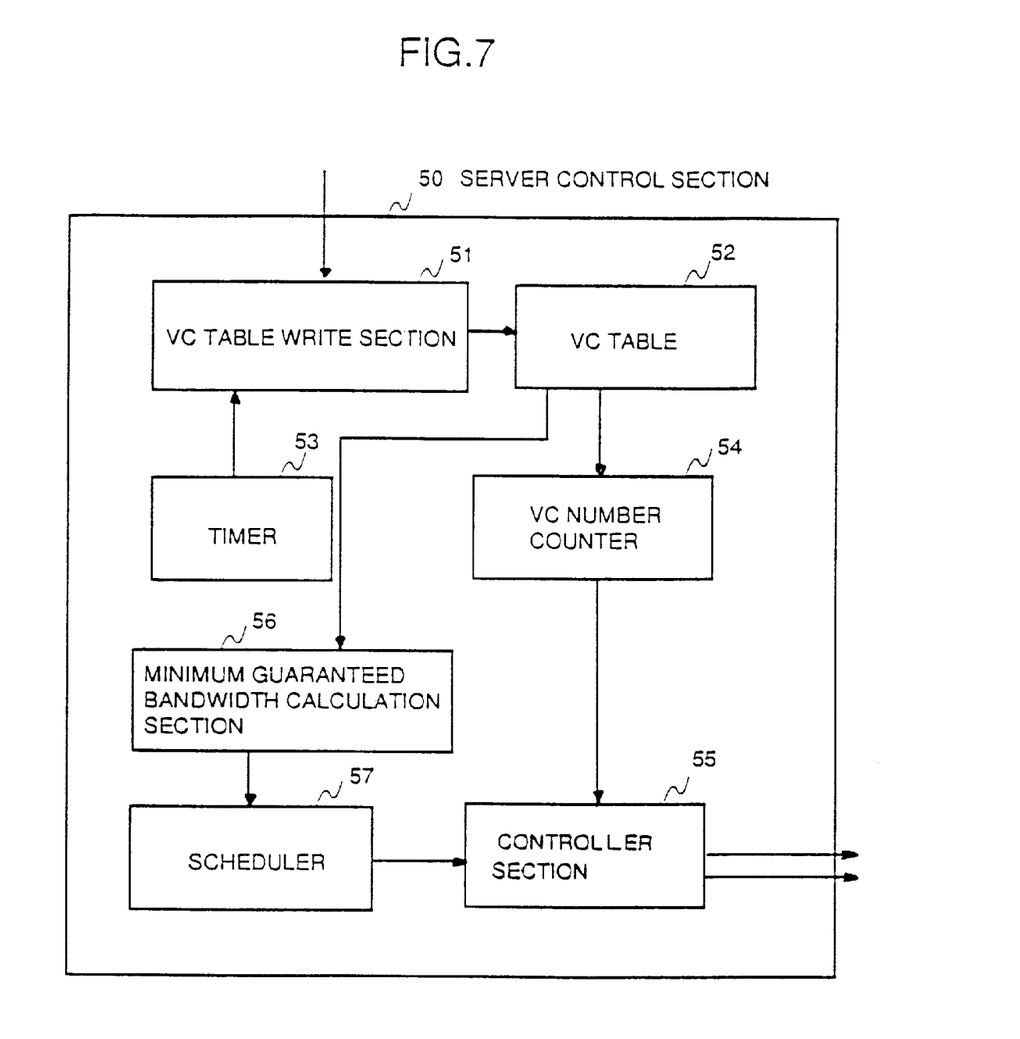
FIG. 7 is a block diagram of a server control section of the third embodiment of the present invention.

FIG. 7 is a block diagram showing the composition of the server control section 50. The server control section 50 comprises the VC table write section 51 for updating the count of the cell number in the VC table when data is input to the node 10, the timer 53 provided in each VC for checking whether transmission is over, the VC table 52 for managing the minimum guaranteed bandwidth and recording whether data is being transmitted in each VC, the VC number counter 54 for counting the VC number based on the VC table 52, the minimum guaranteed bandwidth calculation section 56 for totaling per class the minimum guaranteed bandwidths of VC's being transmitted, the scheduler 57 for setting service time for each class at the minimum guaranteed bandwidth rate, and the controller section 55 for controlling cell output from the servers 21 and 31 based on the value of the VC number counter 54 and the service time set by the scheduler 57. The scheduler 57 sets output time of the next cell to ((53×8)/minimum guaranteed bandwidth) after a cell is output from the server 21-1.

The counters 21-1 and 31-2 in the server are set in the same way as described in the first embodiment. When the minimum guaranteed bandwidth is not zero, a cell is priorly output from the minimum guaranteed bandwidth and the server 21-1. That is, the controller section 50 outputs a cell from the server 21-1 at the time set by the scheduler 57. Only when no cell is output from the server 21-1, like the first and second embodiments, a cell is output from each class according to the values α and β of the VC number counter 54. The values α and β are managed in the same way explained in the first and second embodiments.

As explained above, in the present invention, each of a plural of nodes comprises different buffer per different service class, counts the VC number in the buffer and fairly offers service by changing the service rate according to the VC number.

What is claimed is:

1. A buffer control unit of a node in an asynchronous transfer network wherein data belonging to a plurality of service classes is transferred, said buffer control unit comprising:
identification means for identifying a service class of reception data;
a buffer provided in each service class to which said reception data identified by said identification means is input; and
control means for dynamically counting a number of virtual channels per service class wherein data is being transmitted.

2. The buffer control unit of claim 1, wherein said control means comprises:

a counter provided in each service class for displaying number of data that can be output from a service class;

calculation means for calculating the number of virtual channels per service class wherein data is being transmitted; and setting means for setting said number of virtual channels in each service class calculated by said calculation means as an initial value to each corresponding counter, decreasing a value of each said corresponding counter by one whenever one piece of data is output from a service class, and when all count values of each said corresponding counter become zero, newly setting said number of virtual channels in each service class calculated by said calculation means to each said corresponding counter.

3. The buffer control unit of claim 2, wherein said control means comprises discrimination means for setting a value generated by multiplying said number of virtual channels in each service class calculated by said calculation means by a certain coefficient and discriminating a service class.

4. A buffer control unit of a node in an asynchronous transfer network wherein data belonging to a plurality of service classes is transferred, said buffer control unit comprising:
identification means for identifying a service class of a reception cell;
a buffer provided in each service class to which said reception cell identified by said identification means is input;
first counter provided in each service class for displaying number of cells that can be output from said buffer;
a table wherein transmission state of each virtual channel is recorded;
a timer for measuring transmission time of each virtual channel;
rewrite means for rewriting said transmission state of each virtual channel based on information from said identification means and said time measured by said time;
a second counter for dynamically counting a number of virtual channels per service class wherein data is being transmitted based on said transmission state of each virtual channel recorded in said table; and
setting means for setting said count value in each service class of said second counter as an initial value to a corresponding first counter, outputting a cell from a buffer in a service class wherein a count value of said first counter is not zero, decreasing said count value of said corresponding first counter by one whenever one cell is output, and when all count values of first counters becomes zero, newly setting said counter value of said second counter in each service class to each of said corresponding first counters.

5. The buffer control unit of claim 4, further comprising discrimination means for setting a value generated by multiplying said count value of said second counter by a certain coefficient to said first counter and discriminating each service class.

6. A buffer control unit of a node in an asynchronous network wherein data belonging to a plurality of service classes is transferred, said buffer control unit comprising:
identification means for identifying a service class of reception data;
a buffer provided in each service class to which said reception data identified by said identification means is input; and control means for dynamically counting a number of virtual channels per service class wherein data exists in said buffer and controlling output rate among said buffers based on said number of virtual channels.

7. The buffer control unit of claim 6, wherein said control means comprises:
a counter provided in each service class for displaying number of data that can be output from a service class;
calculation means for calculating per service class number of virtual channels wherein data is being transmitted;
setting means for setting said number of virtual channels in each service class calculated by said calculation means as an initial value to each corresponding counter, decreasing said value of each said counter by one whenever a piece of data is output from a service class, and when all values of counters become zero, newly setting said number of virtual channels in each service class calculated by said calculation means to said corresponding counter.

8. The buffer control unit of claim 7, wherein said control means comprises discrimination means for setting a value generated by multiplying said number of virtual channels in each service class calculated by said calculation means by a certain coefficient to said counter and discriminating a service class.

9. A buffer control unit of a node in an asynchronous transfer network wherein a cell belonging to a plurality of service classes is transferred, said buffer control unit comprising:
identification means for identifying a service class of reception cell;
a buffer provided in each service class to which said reception cell identified by said identification means is input;
a first counter provided in each service class for displaying a number of cells that can be output from said buffer;
a table wherein a transmission state of each virtual channel is recorded;
a timer for measuring transmission time of each virtual channel;
rewrite means for rewriting said transmission state of said virtual channel recorded in said table based on information from said identification means and said time measured by said timer;
second dynamically counter for counting a number of virtual channels per service class wherein data is being transmitted based on said transmission state of each virtual channel recorded in said table; and
setting means for setting said count value of said second counter in each service class as an initial value to each corresponding first counter, outputting one cell from a buffer in a service class wherein said count value of said first counter is not zero, decreasing said value of said corresponding counter by one whenever one cell is output, and all values of first counters become zero, newly setting said count value of said second counter in each service class to said corresponding first counter.

10. The buffer control unit of claim 9, further comprising weighting means for setting a value generated by multiplying said count value of said second counter by a certain coefficient to said first counter and discriminating each service class.

11. A buffer control unit of a node in an asynchronous network wherein data belonging to a plurality of service classes is transferred, said buffer control unit comprising:
  identification means for identifying a service class of reception data;
  a buffer provided in each service class to which said reception data identified by said identification means is input; and
  control means for dynamically totaling a number of virtual channels per service class and minimum guaranteed bandwidth of virtual channels wherein data is being transmitted, and controlling output rates among said buffers based on said total of said number of virtual channels and said minimum guaranteed bandwidth of virtual channels.

12. The buffer control unit of claim 11, wherein said control unit comprises:
  a counter provided in each service class for displaying a number of data that can be output from a service class;
  calculation means for calculating number of virtual channels per service class wherein data is being transmitted;
  calculation means for totaling said number and minimum guaranteed bandwidth of virtual channels wherein data is being transmitted;
  a scheduler for managing data transmission time in each service class based on said total of said minimum guaranteed bandwidth; and
  outputting means for setting said number of virtual channels in each service class calculated by said calculation means as an initial value to a corresponding counter, when said scheduler does not indicate transmission time, outputting data from a service class based on said counter value, decreasing said value of said corresponding counter by one whenever a piece of data is output, when all counter values become zero, newly setting said number of virtual channels in each service class calculate by said calculation means to said counter, and when said scheduler indicates said transmission time, outputting data of a virtual channel wherein said minimum guaranteed bandwidth is set.

13. The buffer control unit of claim 12, wherein said control means comprises discrimination means for setting a value generated by multiplying said number of virtual channels in each service class calculated by said calculation means for calculating number of virtual channels by a certain coefficient and discriminating a service class.

14. A buffer control unit of a node in an asychronous network wherein data belonging to a plurality of service classes is transferred,
  said buffer control unit comprising:
    identification means for identifying a service class of reception cell;
    a buffer provided in each service class to which said reception cell identified by said identification means is input;
    a first counter provided in each service class for displaying a number of cells that can be output from said buffer;
    a table of transmission state and minimum guaranteed bandwidth of each virtual channel;
    a timer for measuring transmission time of each virtual channel;
    rewrite means for rewriting said transmission state of said virtual channel recorded in said table based on information from said identification means and said time measured by said timer;
    a second counter for dynamically counting a number of virtual channels per service class wherein data is being transmitted based on said transmission state of each virtual channel recorded in said table;
    calculation means for totaling said number and minimum guaranteed bandwidth of virtual channels recorded in said table;
    a scheduler for managing data transmission time in each service class based on said total of said minimum guaranteed bandwidth; and
    outputting means for setting count value of said second counter in each service class as an initial value to a corresponding first counter, when said scheduler does not indicate said transmission time, outputting a cell from a buffer in a service class wherein count value of said first counter is not zero, decreasing said counter value of said corresponding first counter by one whenever one cell is output, when all said count values of said each first counter become zero, newly setting said count value of said second counter in each service class to each corresponding first counter, and when said scheduler indicates said transmission time, outputting a cell of a virtual channel wherein said minimum guaranteed bandwidth is set.

15. The buffer control unit of claim 14, comprising weighting means for setting a value generated by multiplying said count value of said second counter by a certain coefficient to said first counter and discriminating each service class.

16. A buffer control method of a node in an asynchronous network wherein data belonging to a plurality of service classes is transferred,
  said buffer control method comprising the steps of:
    identifying a service class of reception data;
    inputting said identified data to a buffer provided in each service class; and
    dynamically counting a number of virtual channels per service class wherein data is being transmitted and controlling data output among said buffers based on a rate corresponding to said number of virtual channels in each service class.

17. The buffer control method of claim 16, further comprising a discrimination step for multiplying said number of virtual channels in each service class by a certain coefficient and discriminating each service class.

18. The buffer control method of claim 16 comprising, instead of said counting step, a control step of counting a number of virtual channels Per service class wherein data exists in said buffer and controlling data output among said buffers based on a rate corresponding to said number of virtual channels in each service class.

19. The buffer control method of claim 18, further comprising a discrimination step for multiplying said number of virtual channels in each service class by a certain coefficient and discriminating each service class.

20. The buffer control method of claim 16, further comprising a step of when a virtual channel wherein minimum guaranteed bandwidth is specified exits, priority outputting data of said virtual channel wherein said minimum guaranteed bandwidth is specified from said buffer.

* * * * *